United States Patent
Arnoth (12)

(10) Patent No.: US 7,392,925 B1
(45) Date of Patent: Jul. 1, 2008

(54) HANDHELD FLUID COOLED ELECTRIC SOLDER TWEEZERS

(76) Inventor: Richard N. Arnoth, 40 Satinwood St., Central Islip, NY (US) 11722-4741

( * ) Notice: Subject to any disclaimer, the term of this patent is extended or adjusted under 35 U.S.C. 154(b) by 574 days.

(21) Appl. No.: 11/105,340

(22) Filed: Apr. 13, 2005

(51) Int. Cl.
*B23K 3/00* (2006.01)
(52) U.S. Cl. ............................. 228/52; 228/46; 228/222
(58) Field of Classification Search .................. 228/52, 228/222, 46
See application file for complete search history.

(56) References Cited

U.S. PATENT DOCUMENTS

| 3,673,681 | A | * | 7/1972 | Steranko | 29/840 |
| 3,804,320 | A | * | 4/1974 | Vandermark | 228/19 |
| 5,145,101 | A | | 9/1992 | Brown et al. | |
| 5,182,435 | A | | 1/1993 | Wang | |
| 5,796,072 | A | | 8/1998 | Okuno | |
| 5,909,535 | A | | 6/1999 | Curwick et al. | |
| 6,750,431 | B2 | | 6/2004 | Miyazaki | |
| 6,786,386 | B2 | | 9/2004 | Miyazaki | |

* cited by examiner

*Primary Examiner*—Vickie Kim
*Assistant Examiner*—Megha Mehta
(74) *Attorney, Agent, or Firm*—Richard L. Miller

(57) ABSTRACT

A handheld fluid cooled electric solder tweezers. A pair of soldering heads extend from a pair of tweezer members, respectively, and are operatively connected to a cooling apparatus. The cooling apparatus of each tweezer member includes a pair of heat dissipating tubes that travel in an associated tweezer member, with distal ends thereof in fluid communication with an associated soldering head, and with a proximal end of one thereof fluidly communicating with a fluid source. A crossover tube fluidly communicates the proximal end of one tube of one tweezer member with the proximal end of one tube of the other tweezer member. The fluid source is preferably water that enters and flows through one tube of one tweezer member to and through an associated soldering head, then through the other tube of the one tweezer member, then through the crossover tube, then through one tube of the other tweezer member to and through an associated soldering head, then through the other tube of the other tweezer member, and back to the fluid source so as to form a closed loop, and in doing so, cools the pair of tweezer members.

34 Claims, 2 Drawing Sheets

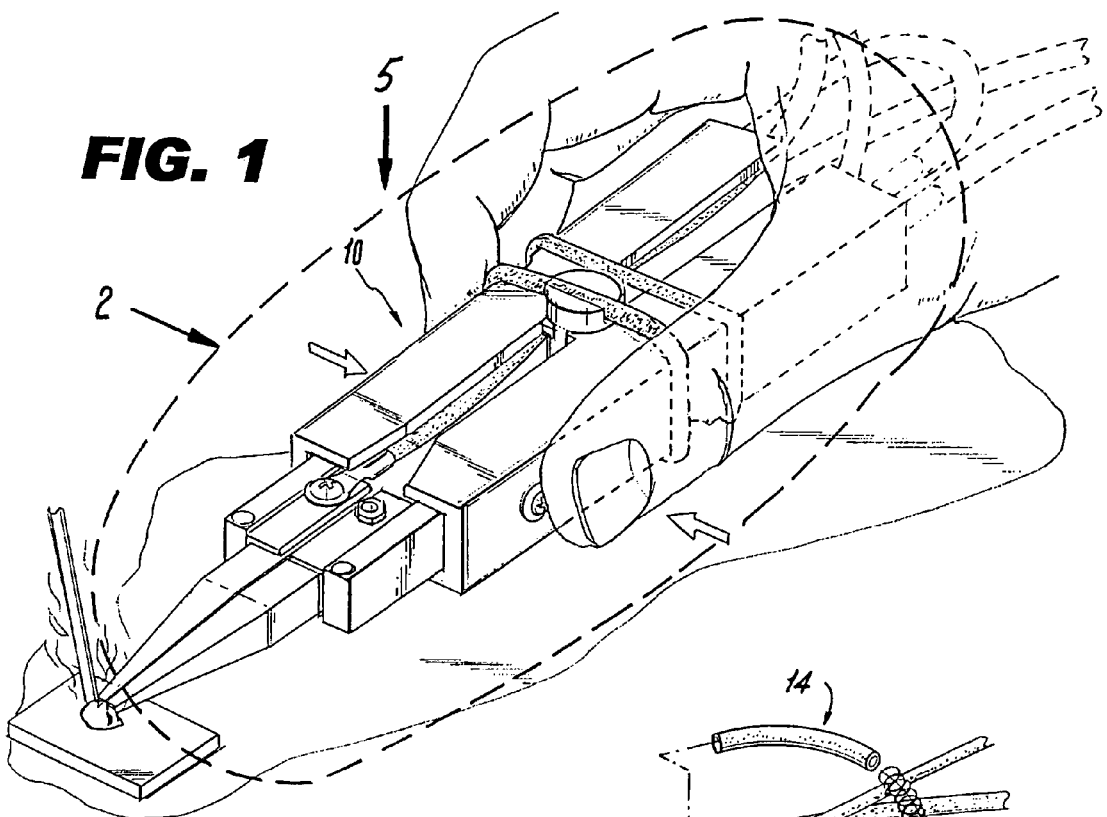
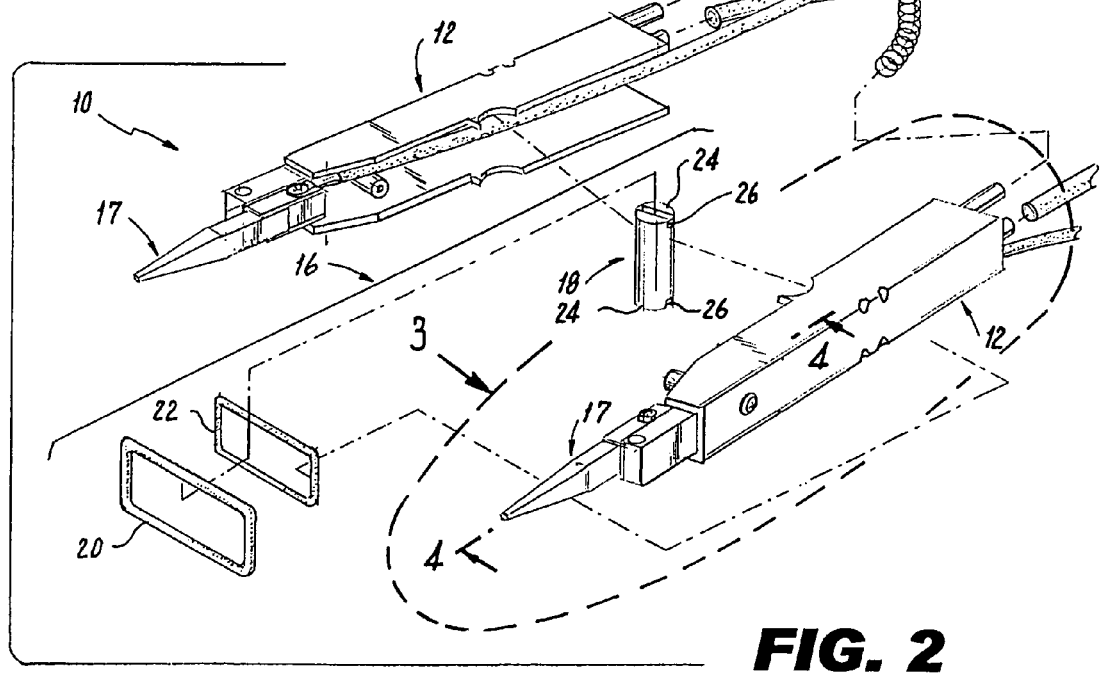

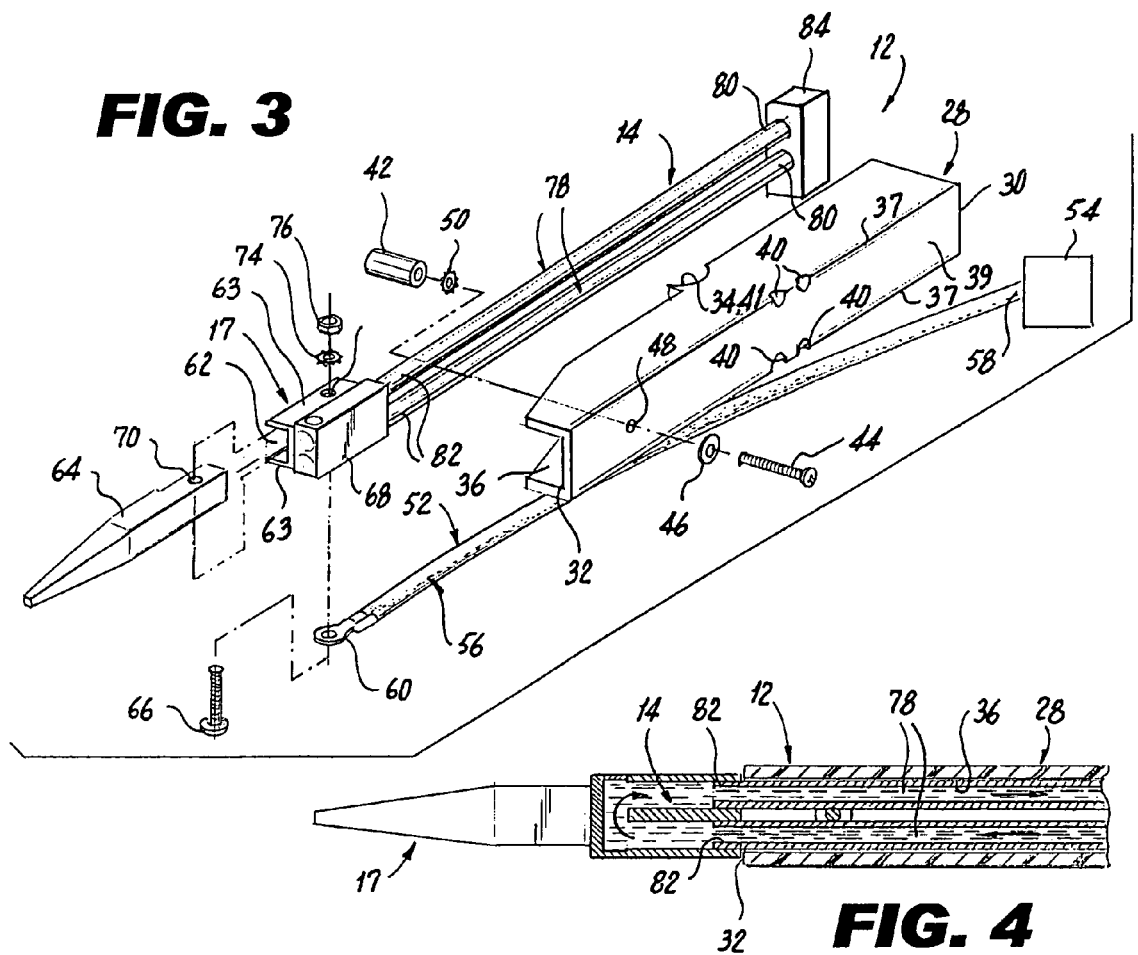
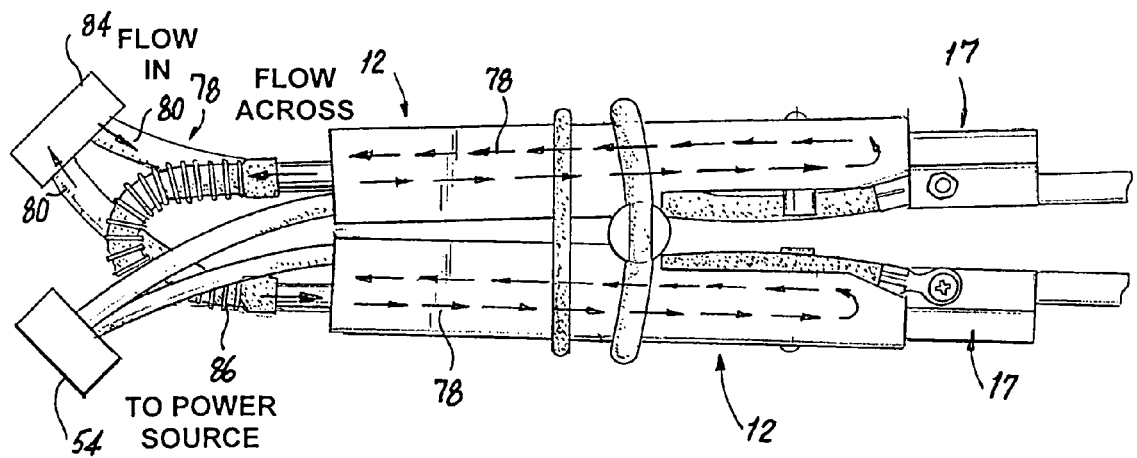

HANDHELD FLUID COOLED ELECTRIC SOLDER TWEEZERS

BACKGROUND OF THE INVENTION

1. Field of the Invention

The present invention relates to electric solder tweezers, and more particularly, the present invention relates to handheld fluid cooled electric solder tweezers.

2. Description of the Prior Art

Numerous innovations for handheld soldering devices have been provided in the prior art that will be described. Even though these innovations may be suitable for the specific individual purposes to which they address, however, they differ from the present invention.

A FIRST EXAMPLE, U.S. Pat. No. 5,145,101 to Brown et al. teaches a tweezer-type heating device for installation and removal of electronic components with respect to a substrate, such as for SMC installation and through hole installation or removal. More specifically, a handheld tweezer-type heating device is provided in which a wide variety of different sized (and shaped) tips can be used with a high degree of accuracy in terms of thermo/mechanical contact. Tolerances in the parts of the handpiece, the assembly, the heaters and the tips that may bring the bottom edges of the tips out of their alignment plane are very easily corrected with an adjustable hinge which, by loosening of a screw and sliding the parts with respect to each other, allows proper alignment to be achieved. Still further, a thumb screw is provided at the back of the handpiece to allow the gap between the tips to be slightly opened or closed. This is useful in accommodating tolerances in the components. Also, it allows the operator to slip-fit the tips over the component and make proper thermo/mechanical contact with little or no squeezing of the handpiece, thereby minimizing the chance of mechanically damaging the component or its leads by squeezing too hard, or causing damage to adjacent components. A plate-like alignment tool with projecting tab portions that engages in an edge slot of the tip elements and contacts other surfaces of the tip elements, as well, enables simultaneous aligning of the tip elements axially, laterally and rotationally with respect to each other and the mounting units.

A SECOND EXAMPLE, U.S. Pat. No. 5,182,435 to Wang teaches an electric soldering iron that has an elongated hollow handle casing having a tubular hollow holder extending from one end thereof and supporting a soldering bit heated by an electric heater within the holder. A forked suction pipe is secured to the holder and includes a main pipe having an intake port at one end disposed adjacent to the soldering tip and an outlet port at its other end connected to an induced-draft fan assembly through a flexible air pipe. A branch pipe of the suction pipe extends laterally from the main pipe and has an intake port connected to the interior of the casing through a heat resistant hose. Actuation of the induced-draft fan causes soldering fumes generated at the tip to be drawn into the main pipe and for cooling ambient air to be drawn through the casing from an inlet at its other end to remove excess heat from the casing.

A THIRD EXAMPLE, U.S. Pat. No. 5,796,072 to Okuno teaches an electric soldering iron that is made difficult to heat up at the front end of its grip. A metal pipe is inserted in the grip so that the pipe comes into close contact at least partially with the grip, with a gap formed between the outer peripheral surface of the pipe at its front end and the inner peripheral surface of the grip. The heat produced by the accumulator conducts through the pipe to the grip and disperses throughout the grip. Thus, the front tend of the grip is less likely to heat up.

A FOURTH EXAMPLE, U.S. Pat. No. 5,909,535 to Curwick, et al. teaches a hot air torch for the welding of plastic featuring an air flow around and about the inner portions of tubular members which entrains unwanted internally generated heat prior to the welding tip to provide a torch body which is safe to the touch while at the same time providing suitably heated air at the welding tip. Excess accumulated heat is vented overboard in the vicinity of the welding tip.

A FIFTH EXAMPLE, U.S. Pat. No. 6,750,431 to Miyazaki teaches a tweezer-type hand-held device for removing an electric or electronic component from a substrate that is provided with a pair of contact pieces to be brought into contact with the component to grasp and heat the component and melt solder which fixes the component on the substrate. The contacts are respectively held by a pair of legs which, in turn, are interconnected with each other such that one of the legs moves toward the other with the legs and contact pieces being kept in parallel with each other.

A SIXTH EXAMPLE, U.S. Pat. No. 6,786,386 to Miyazaki teaches a soldering iron that comprises a tip end; a heater portion for electrically heating the tip end of the soldering iron; a holding portion provided at the rear end of the heater portion: a heat pipe structure provided in the holding portion; a first heat pipe holder for holding a frontal portion of the heat pipe structure to which heat generated at the heater portion is transferred; a second heat pipe holder for holding a rear part of the heat pipe structure; and a grip portion placed externally around the first heat pipe holder.

It is apparent that numerous innovations for handheld soldering devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide handheld fluid cooled electric solder tweezers that avoids the disadvantages of the prior art.

ANOTHER OBJECT of the present invention is to provide handheld fluid cooled electric solder tweezers that is simple to use.

BRIEFLY STATED, STILL ANOTHER OBJECT of the present invention is to provide a handheld fluid cooled electric solder tweezers. A pair of soldering heads extend from a pair of tweezer members, respectively, and are operatively connected to a cooling apparatus. The cooling apparatus of each tweezer member includes a pair of heat dissipating tubes that travel in an associated tweezer member, with distal ends thereof in fluid communication with an associated soldering head, and with a proximal end of one thereof fluidly communicating with a fluid source. A crossover tube fluidly communicates the proximal end of one tube of one tweezer member with the proximal end of one tube of the other tweezer member. The fluid source is preferably water that enters and flows through one tube of one tweezer member to and through an associated soldering head, then through the other tube of the one tweezer member, then through the crossover tube, then through one tube of the other tweezer member to and through an associated soldering head, then through the other tube of the other tweezer member, and back to the fluid source so as to form a closed loop, and in doing so, cools the pair of tweezer members.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the handheld fluid cooled electric solder tweezers of the present invention in use;

FIG. 2 is a reduced exploded diagrammatic perspective view of the area generally enclosed by the dotted curve identified by ARROW 2 in FIG. 1 of the handheld fluid cooled electric solder tweezers of the present invention;

FIG. 3 is an enlarged exploded diagrammatic perspective view of the area generally enclosed by the dotted curve identified by ARROW 3 in FIG. 2 of one tweezer member of the handheld fluid cooled electric solder tweezers of the present invention;

FIG. 4 is an enlarged diagrammatic cross sectional view taken along LINE 4-4 in FIG. 2 showing the cooling fluid flow through one tweezer member of the handheld fluid cooled electric solder tweezers of the present invention; and FIG. 5 is a diagrammatic top plan view taken generally in the direction of ARROW 5 in FIG. 1, and rotated 180 degrees showing the cooling fluid flow through the handheld fluid cooled electric solder tweezers of the present invention.

LIST OF REFERENCE NUMERALS UTILIZED IN THE DRAWING

10 handheld fluid cooled electric solder tweezers of present invention
12 pair of tweezer members
14 cooling apparatus
16 pivoting apparatus
17 pair of soldering heads
18 pivot pin of pivoting apparatus 16
20 first resilient band of pivoting apparatus 16
22 second resilient band of pivoting apparatus 16
24 pair of ends of pivot pin 18 of pivoting apparatus 16
26 blind slot extending transversely across each end of pair of ends 24 of pivot pin 18 of pivoting apparatus 16
28 body of each tweezer member of pair of tweezer members 12
30 proximal end of body 28 of each tweezer member of pair of tweezer members 12
32 distal end of body 28 of each tweezer member of pair of tweezer members 12
34 intermediate point of body 28 of each tweezer member of pair of tweezer members 12
36 channel in body 28 of each tweezer member of pair of tweezer members 12
37 pair of connecting edges of body 28 of each tweezer member of pair of tweezer members 12
39 web of body 28 of each tweezer member of pair of tweezer members 12
40 at least three notches in each connecting edge of pair of connecting edges 37 of body 28 of each tweezer member of pair of tweezer members 12
41 recess of intermediate point 34 of body 28 of each tweezer member of pair of tweezer members 12
42 stop of body 28 of each tweezer member of pair of tweezer members 12
44 screw of stop 42 of body 28 of each tweezer member of pair of tweezer members 12
46 external washer of stop 42 of body 28 of each tweezer member of pair of tweezer members 12
48 bore in web 39 of body 28 of each tweezer member of pair of tweezer members 12
50 internal washer of stop 42 of body 28 of each tweezer member of pair of tweezer members 12
52 power source interface
54 power source
56 wire of power source interface 52 of each soldering head of pair of soldering heads 17
58 proximal end of wire 56 of power source interface 52 of each soldering head of pair of soldering heads 17
60 distal end of wire 56 of power source interface 52 of each soldering head of pair of soldering heads 17
62 channel in each soldering head of pair of soldering heads 17
63 pair of flanges of each soldering head of pair of soldering heads 17
64 soldering tip of each soldering head of pair of soldering heads 17
66 screw of each soldering head of pair of soldering heads 17
68 bore in one flange of pair of flanges 63 of each soldering head of pair of soldering heads 17
70 through bore in soldering tip 64 of soldering head of pair of soldering heads 17
72 bore in other flange of pair of flanges 63 of each soldering head of pair of soldering heads 17
74 washer of each soldering head of pair of soldering heads 17
75 nut of each soldering head of pair of soldering heads 17
78 pair of tubes of cooling apparatus 14 of each tweezer member of pair of tweezer members 12
80 proximal ends of pair of tubes 78 of cooling apparatus 14 of each tweezer member of pair of tweezer members 12
82 distal ends of pair of tubes 78 of cooling apparatus 14 of each tweezer member of pair of tweezer members 12
84 fluid source
86 crossover tube of cooling apparatus 14

DETAILED DESCRIPTION OF THE PREFERRED EMBODIMENT

Referring now to the figures, in which like numerals indicate like parts, and particularly to FIG. 1, which is a diagrammatic perspective view of the handheld fluid cooled electric solder tweezers of the present invention in use, the handheld fluid cooled electric solder tweezers of the present invention is shown generally at 10.

The overall configuration of the handheld fluid cooled electric solder tweezers 10 can best be seen in FIG. 2, which is a reduced exploded diagrammatic perspective view of the area generally enclosed by the dotted curve identified by ARROW 2 in FIG. 1 of the handheld fluid cooled electric solder tweezers of the present invention, and as such, will be discussed with reference thereto.

The handheld fluid cooled electric solder tweezers 10 comprise a pair of tweezer members 12, a cooling apparatus 14, a pivoting apparatus 16, and a pair of soldering heads 17. The pair of tweezer members 12 are pivotally attached to each other. The cooling apparatus 14 is operatively connected to, and cools, the pair of tweezer members 12. The pivoting apparatus 16 pivotally attaches one tweezer member 12 to the other tweezer member 12. The pair of soldering heads 17 extend from the pair of tweezer members 12, respectively, and are operatively connected to the cooling apparatus 14.

The pivoting apparatus 16 comprises a pivot pin 18, a first resilient band 20, and a second resilient band 22. The pivot pin 18 of the pivoting apparatus 16 pivotally attaches one tweezer member 12 to the other tweezer member 12, is generally cylindrically-shaped, and has a pair of ends 24. Each end 24 of the pivot pin 18 of the pivoting apparatus 16 has a blind slot 26 extending transversely thereacross.

The first resilient band 20 of the pivoting apparatus 16 is generally rectangularly-shaped, extends around the pair of tweezer members 12 to maintain the pair of tweezer members 12 against the pivot pin 18 of the pivoting apparatus 16, and seats in the blind slot 26 in each end 24 of the pivot pin 18 of the pivoting apparatus 16 to maintain itself in place.

The second resilient band 22 of the pivoting apparatus 16 is generally rectangularly-shaped, extends around the pair of tweezer members 12 to adjust biasing of the pair of tweezer members 12, and is more resilient than the first resilient band 20 of the pivoting apparatus 16.

The specific configuration of each tweezer member 12 can best be seen in FIGS. 3 and 4, which are, respectively, an enlarged exploded diagrammatic perspective view of the area generally enclosed by the dotted curve identified by ARROW 3 in FIG. 2 of one tweezer member of the handheld fluid cooled electric solder tweezers of the present invention, and an enlarged diagrammatic cross sectional view taken along LINE 4-4 in FIG. 2 showing the cooling fluid flow through one tweezer member of the handheld fluid cooled electric solder tweezers of the present invention, and as such, will be discussed with reference thereto.

Each tweezer member 12 comprises a body 28, one soldering head 17, and a portion of the cooling apparatus 14.

The body 28 of each tweezer member 12 is slender, elongated, and has a generally channel-shaped lateral cross section, a proximal end 30, a distal end 32, and an intermediate point 34 that is intermediate the proximal end 30 thereof and the distal end 32 thereof.

The body 28 of each tweezer member 12 has a channel 36 therealong, a pair of connecting edges 37, and a web 39, as a result of the channel-shaped lateral cross section thereof. The channel 36 of the body 28 of each tweezer member 12 face each other.

The intermediate point 34 of the body 28 of each tweezer member 12 is formed into a recess 41. The recess 41 of the intermediate point 34 of the body 28 of each tweezer member 12 is generally semi-circular-shaped and pivotally receives the pivot pin 18 of the pivoting apparatus 16.

Each connecting edge 37 of the body 28 of each tweezer member 12 has at least three notches 40 therein. A forwardmost notch 40 in the pair of connecting edges 37 of the body 28 of each tweezer member 12 aligns with the blind slot 26 in each end 24 of the pivot pin 18 of the pivoting apparatus 16 and receives the first resilient band 20 of the pivoting apparatus 16 to further maintain the first resilient band 20 of the pivoting apparatus 16 in place.

Remaining notches 40 in the pair of connecting edges 37 of the body 28 of each tweezer member 12 are disposed rearward of the forwardmost notch 40 in the pair of connecting edges 37 of the body 28 of an associated tweezer member 12 and selectively receive the second resilient band 22 of the pivoting apparatus 16 to adjust biasing of the pair of tweezer members 12.

The body 28 of each tweezer member 12 further has a stop 42. The stop 42 of the body 28 of each tweezer member 12 extends inwardly into the channel 36 in the body 28 of an associated tweezer member 12 and towards each other and is disposed forward of the pivot pin 18 of the pivoting apparatus 16 to limit pivoting of the pair of tweezer members 12 relative to each other.

The stop 42 of the body 28 of each tweezer member 12 is generally cylindrically-shaped and is affixed to the web 39 of the body 28 of an associated tweezer member 12 by a screw 44 passing through an external washer 46, through a bore 48 in the web 39 of the body 28 of the associated tweezer member 12, through an internal washer 50, and threadably into the stop 42 of the body 28 of the associated tweezer member 12.

The soldering head 17 of an associated tweezer member 12 extends forwardly from the distal end 32 of the associated tweezer member 12 and is in electrical communication with a power source interface 52 for electrically communicating with a power source 54.

The power source interface 52 of each soldering head 17 is a wire 56 having a proximal end 58 and a distal end 60. The wire 56 of the power source interface 52 of each soldering head 17 travels in the channel 36 of the body 28 of an associated tweezer member 12, with the distal end 60 thereof in electrical communication with an associated soldering head 17, and with the proximal end 58 thereof for electrically communicating with the power source 54.

Each soldering head 17 is generally channel-shaped in lateral cross section so as to form a channel 62 therein with a pair of flanges 63 and has a soldering tip 64 received in the channel 62 in the associated soldering head 17.

The distal end 60 of the wire 56 of the power source interface 52 of each soldering head 17 has a screw 66 passing therethrough that then passes through a bore 68 in one flange 63 of the channel 62 of an associated soldering head 17, then through a through bore 70 in the soldering tip 64 of the associated soldering head 17, then through a bore 72 in the other flange 63 of the channel 62 of the associated soldering head 17, then through a washer 74, and threadably into a nut 76.

The cooling apparatus 14 of each tweezer member 12 comprises a pair of tubes 78 that are heat dissipating and have proximal ends 80 and distal ends 82. The pair of tubes 78 of the cooling apparatus 14 of each tweezer member 12 travel in the channel 36 of the body 28 of an associated tweezer member 12, with the distal ends 82 thereof in fluid communication with an associated soldering head 17, and with the proximal end 80 of one thereof for fluidly communicating with a fluid source 84.

As shown in FIG. 5, which is a diagrammatic top plan view taken generally in the direction of ARROW 5 in FIG. 1, rotated 180 degrees showing, the cooling fluid flow through the handheld fluid cooled electric solder tweezers of the present invention. The cooling apparatus 14 further comprises a crossover tube 86. The crossover tube 86 of the cooling apparatus 14 is flexible and fluidly communicates the proximal end 80 of one tube 78 of one tweezer member 12 with the proximal end 80 of one tube 78 of the other tweezer member 12.

Fluid, which can be a gas or a liquid, such as water and the like, from the fluid source 84 enters and flows through one tube 78 of one tweezer member 12 to and through an associated soldering head 17, then through the other tube 78 of the one tweezer member 12, then through the crossover tube 86, then through one tube 78 of the other tweezer member 12 to and through an associated soldering head 17, then through the other tube 78 of the other tweezer member 12, and back to the fluid source 84 so as to form a closed loop, and in doing so, cools the pair of tweezer members 12.

It will be understood that each of the elements described above, or two or more together, may also find a useful application in other types of constructions differing from the types described above.

While the invention has been illustrated and described as embodied in handheld fluid cooled electric solder tweezers, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A handheld fluid cooled electric solder tweezers, comprising:
   a) a pair of tweezer members;
   b) a cooling apparatus;
   c) a pivoting apparatus; and
   d) a pair of soldering heads;
   wherein said pair of tweezer members are pivotally attached to each other;
   wherein each said tweezer member comprises a portion of said cooling apparatus;
   wherein said cooling apparatus comprises a pair of tubes and a crossover tube where said pair of tubes of said cooling apparatus of each said tweezer member travel in a channel of a body of each said tweezer member, and said crossover tube of said cooling apparatus fluidly communicates a proximal end of one said tube of one said tweezer member with a proximal end of one said tube of said other tweezer member;
   wherein said cooling apparatus cools said pair of tweezer members;
   wherein said pivoting apparatus pivotally attaches one said tweezer member to said other tweezer member;
   wherein said pair of soldering heads extend from said pair of tweezer members, respectively; and wherein said pair of soldering heads are operatively connected to said cooling apparatus.

2. The tweezers as defined in claim 1, wherein said pivoting apparatus comprises a pivot pin;
   wherein said pivoting apparatus comprises a first resilient band; and
   wherein said pivoting apparatus comprises a second resilient band.

3. The tweezers as defined in claim 2, wherein said pivot pin of said pivoting apparatus pivotally attaches one tweezer member to said other tweezer member; and
   wherein said pivot pin of said pivoting apparatus has a pair of ends.

4. The tweezers as defined in claim 2, wherein said pivot pin of said pivoting apparatus is generally cylindrically-shaped.

5. The tweezers as defined in claim 3, wherein each end of said pivot pin of said pivoting apparatus has a blind slot extending transversely thereacross.

6. The tweezers as defined in claim 2, wherein said first resilient band of said pivoting apparatus is generally rectangularly-shaped.

7. The tweezers as defined in claim 5, wherein said first resilient band of said pivoting apparatus extends around said pair of tweezer members to maintain said pair of tweezer members against said pivot pin of said pivoting apparatus; and
   wherein said first resilient band of said pivoting apparatus seats in said blind slot in each end of said pivot pin of said pivoting apparatus to maintain itself in place.

8. The tweezers as defined in claim 2, wherein said second resilient band of said pivoting apparatus is generally rectangularly-shaped.

9. The tweezers as defined in claim 2, wherein said second resilient band of said pivoting apparatus extends around said pair of tweezer members to adjust biasing of said pair of tweezer members.

10. The tweezers as defined in claim 2, wherein said second resilient band of said pivoting apparatus is more resilient than said first resilient band of said pivoting apparatus.

11. The tweezers as defined in claim 2, wherein each said tweezer member comprises a body;
    wherein each said tweezer member comprises one soldering head; and
    wherein each said tweezer member comprises a portion of said cooling apparatus.

12. The tweezers as defined in claim 11, wherein said body of each said tweezer member is slender;
    wherein said body of each said tweezer member is elongated;
    wherein said body of each said tweezer member has a generally channel-shaped lateral cross section;
    wherein said body of each said tweezer member has a proximal end;
    wherein said body of each said tweezer member has a distal end;
    wherein said body of each said tweezer member has an intermediate point; and
    wherein said intermediate point of said body of each said tweezer member is intermediate said proximal end thereof and said distal end thereof.

13. The tweezers as defined in claim 11, wherein said body of each said tweezer member has a channel therealong;
    wherein said body of each said tweezer member has a pair of connecting edges; and
    wherein said body of each said tweezer member has a web.

14. The tweezers as defined in claim 13, wherein said channel of said body of each said tweezer member face each other.

15. The tweezers as defined in claim 12, wherein said intermediate point of said body of each said tweezer member is formed into a recess.

16. The tweezers as defined in claim 15, wherein said recess of said intermediate point of said body of each said tweezer member is generally semi-circular-shaped.

17. The tweezers ad defined in claim 15, wherein said recess of said intermediate point of said body of each said tweezer member pivotally receives said pivot pin of said pivoting apparatus.

18. The tweezers as defined in claim 13, wherein each said connecting edge of said body of each said tweezer member has at least three notches therein.

19. The tweezers as defined in claim 18, wherein a forwardmost notch in said pair of connecting edges of said body of each said tweezer member aligns with said blind slot in each end of said pivot pin of said pivoting apparatus; and
    wherein said forwardmost notch is said pair of connecting edges of said body of each said tweezer member receives said first resilient band of said pivoting apparatus to further maintain said first resilient band of said pivoting apparatus in place.

20. The tweezers as defined in claim 19, wherein remaining notches in said pair of connecting edges of said body of each said tweezer member are disposed rearward of said forwardmost notch in said pair of connecting edges of said body of said associated tweezer member; and wherein said remaining notches in said pair of connecting edges of said body of each said tweezer member selectively receive said second resilient band of said pivoting apparatus to adjust biasing of said pair of tweezer members.

21. The tweezers as defined in claim 13, wherein said body of each said tweezer member has a stop.

22. The tweezers as defined in claim 21, wherein said stop of said body of each said tweezer member extends inwardly into said channel in said body of said associated tweezer member;

wherein said stop of said body of each said tweezer member extends towards each other; and wherein said stop of said body of each said tweezer member is disposed forward of said pivot pin of said pivoting apparatus to limit pivoting of said pair of tweezer members relative to each other.

23. The tweezers as defined in claim 22, wherein said stop of said body of each said tweezer member is generally cylindrically-shaped.

24. The tweezers as defined in claim 22, wherein said stop of said body of each said tweezer member is affixed to said web of said body of said associated tweezer member by a screw passing through an external washer, through a bore in said web of said body of said associated tweezer member, through an internal washer, and threadably into said stop of said body of said associated tweezer member.

25. The tweezers as defined in claim 12, wherein said soldering head of an associated tweezer member extends forwardly from said distal end of said associated tweezer member; and wherein said soldering head of said associated tweezer member is in electrical communication with a power source interface for electrically communicating with a power source.

26. The tweezers as defined in claim 25, wherein said power source interface of each said soldering head is a wire;

wherein said wire of said power source interface of each said soldering head has a proximal end; and wherein said wire of said power source interface of each said soldering head has a distal end.

27. The tweezers as defined in claim 26, wherein said wire of said power source interface of each said soldering head travels in said channel of said body of said associated tweezer member, with said distal end thereof in electrical communication with said associated soldering head, and with said proximal end thereof for electrically communicating with the power source.

28. The tweezers as defined in claim 26, wherein each said soldering head is generally channel-shaped in lateral cross section so as to form a channel therein;

wherein said channel of each said soldering head has a pair of flanges; and wherein said soldering tip is received in said channel of said associated soldering head.

29. The tweezers as defined in claim 28, wherein said distal end of said wire of said power source interface of each said soldering head has a screw passing therethrough that then passes through a bore in one flange of said channel of an associated soldering head, then through a through bore in said soldering tip of said associated soldering head, then through a bore in the other flange of said channel of said associated soldering head, then through a washer, and threadably into a nut.

30. The tweezers as defined in claim 13, wherein said pair of tubes of said cooling apparatus of each said tweezer member travel in said channel of said body of said associated tweezer member, with said distal ends thereof in fluid communication with said associated soldering head, and with said proximal end of one thereof for fluidly communicating with a fluid source.

31. The tweezers as defined in claim 30, wherein said crossover tube of said cooling apparatus is flexible.

32. The tweezers as defined in claim 30, wherein said fluid source is one of a gas and a liquid.

33. The tweezers as defined in claim 32, wherein said liquid of said fluid source is water.

34. The tweezers as defined in claim 30, wherein fluid from said fluid source enters and flows through one said tube of one said tweezer member to and through an said associated soldering head, then through said other tube of said one tweezer member, then through said crossover tube, then through one said tube of said other tweezer member to and through an associated soldering head, then through said other tube of said other tweezer member, and back to said fluid source so as to form a closed loop, and in doing so, cools said pair of tweezer members.

* * * * *